Figure 1:
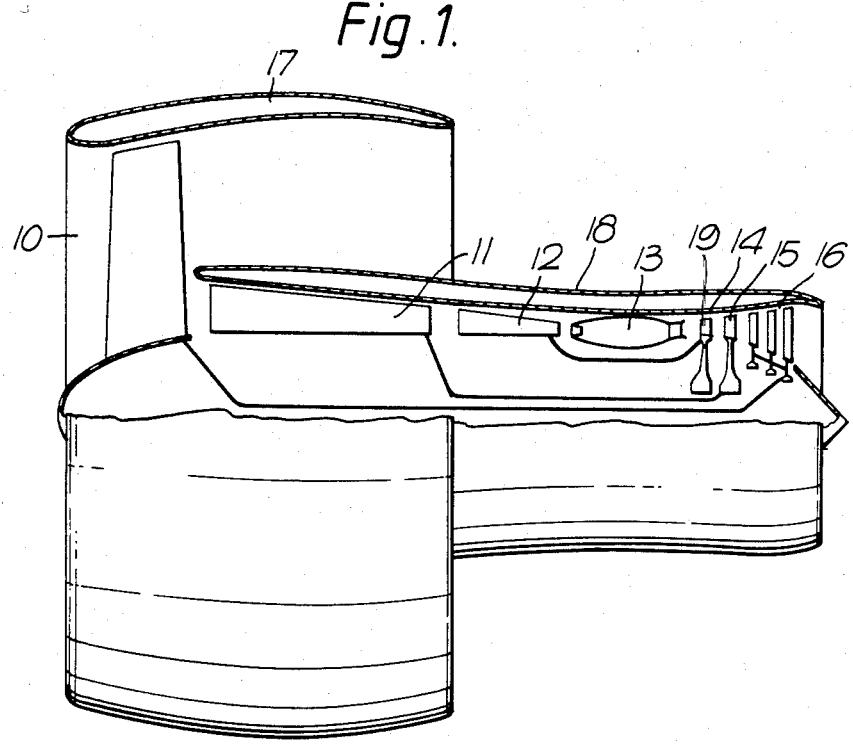
Figure 3:
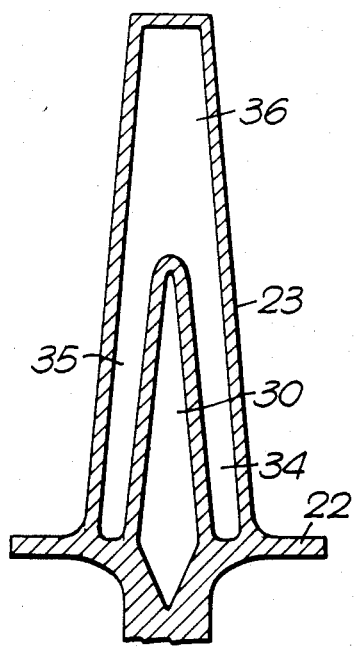

United States Patent [19]

Dodd et al.

[11] Patent Number: 4,500,258

[45] Date of Patent: Feb. 19, 1985

[54] COOLED TURBINE BLADE FOR A GAS TURBINE ENGINE

[75] Inventors: Alec G. Dodd; Martin Hamblett, both of Derby, England

[73] Assignee: Rolls-Royce Limited, London, England

[21] Appl. No.: 497,585

[22] Filed: May 24, 1983

[30] Foreign Application Priority Data

Jun. 8, 1982 [GB] United Kingdom ............... 8216584

[51] Int. Cl.³ .............................................. F01D 5/08
[52] U.S. Cl. ................................ 416/97 R; 416/96 R
[58] Field of Search ............... 416/96 A, 96 R, 97 A, 416/97 R

[56] References Cited

U.S. PATENT DOCUMENTS 3,628,885 12/1971 Sidenstick et al. ................. 416/96
4,326,833 4/1982 Zelahy et al. ................... 416/96 R
4,364,160 12/1982 Eiswerth et al. ................. 416/96 R

FOREIGN PATENT DOCUMENTS 2814027 10/1978 Fed. Rep. of Germany .... 416/97 R
364747 3/1973 U.S.S.R. ........................ 416/97 R Primary Examiner—Henry C. Yuen
Assistant Examiner—John Kwon
Attorney, Agent, or Firm—Cushman, Darby & Cushman

[57] ABSTRACT

A cooled turbine blade is provided with an aerofoil which tapers from root end to tip end so that the thicker root section provides greater resistance to detachment of the aerofoil. In order to provide effective cooling and light weight the aerofoil has a central 'dead' cavity which extends from its root and part way up the aerofoil. Spanwise cooling passages bifurcate to pass between the cavity and the side walls in the relatively constant metal thickness thus provided.

3 Claims, 7 Drawing Figures

COOLED TURBINE BLADE FOR A GAS TURBINE ENGINE

This invention relates to a cooled turbine blade for a gas turbine engine. Such blades must be designed to meet certain mechanical requirements, and the design is complicated by the presence of various cooling air passages within the blade aerofoil. These passages inevitably weaken the aerofoil compared with a solid equivalent. Conversely, the design of the cooling system may be made more difficult by variations in aerofoil shape due to mechanical considerations.

One particular mechanical problem derives from the fact that with a conventional aerofoil of relatively constant section the bending stresses are high at the inner end of the aerofoil. If a blade should fail for any reason (e.g. foreign object damage) it is likely with the conventional blade that the major part of the aerofoil will break off from the rest of the blade. Such a failure can then lead to the detached aerofoil damaging further aerofoils, and in an extreme case all the aerofoils of a particular rotor stage may be broken off in a catastrophic failure.

One way to reduce the chances of such a failure would be to make the blade with a section which tapers from a relatively thick section adjacent the platform to a thin section at the tip. However, this shaping of the aerofoil makes it difficult to achieve an effective cooling configuration combined with low weight.

The present invention provides a blade in which an effective cooling arrangement is combined with a tapered aerofoil.

According to the present invention a cooled turbine blade for a gas turbine engine comprises an aerofoil, cooling air passages extending spanwise of the aerofoil, and a central cavity extending from the root end of the aerofoil part way up the spanwise extent of the aerofoil, said cooling passages bifurcating to pass between said cavity and both flanks of the aerofoil.

Said passages may form part of a 'multi-pass' or serpentine cooling layout, the serpentine passages being of conventional form outboard of the central cavity and splitting at said bifurcation into duplicated passages between the cavity and both flanks of the blades.

Conveniently, the cavity may be vented to a further, separate cooling passage which may extend adjacent the leading edge of the aerofoil. In this case the cavity may be formed using a ceramic core extending from the core used to define this separate passage.

Figure 2:
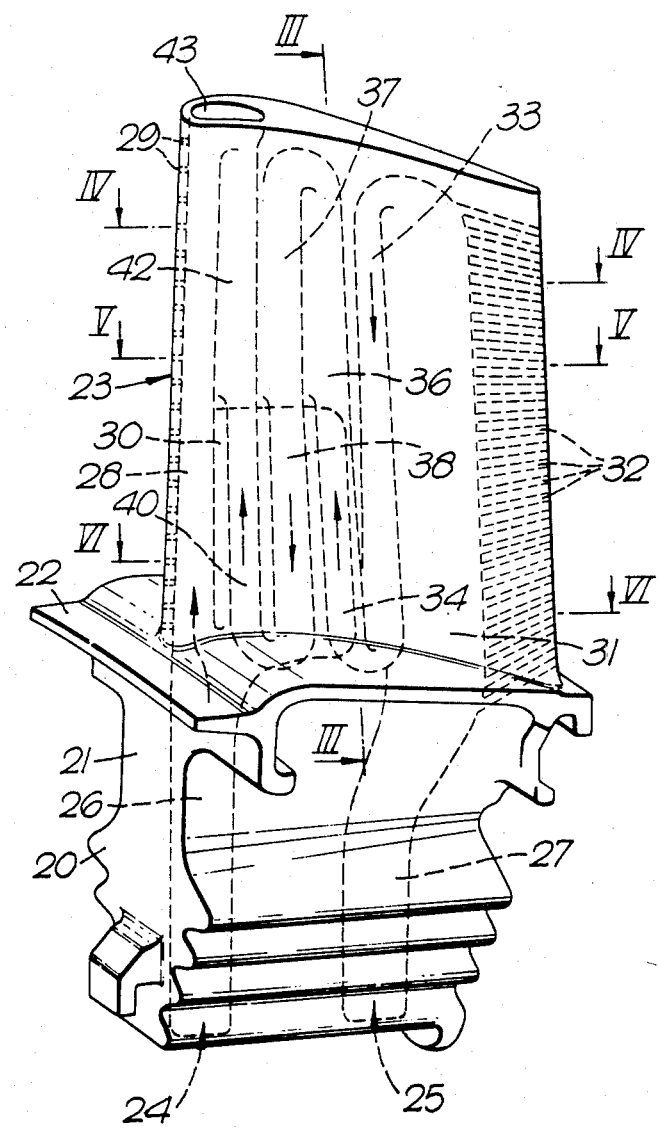
Figure 4:
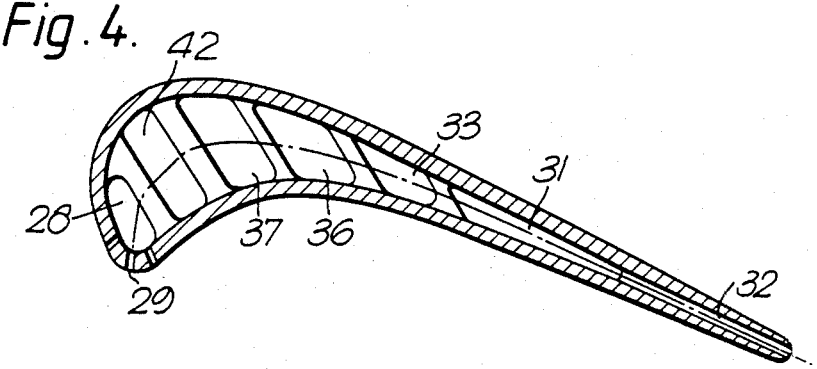
Figure 5:
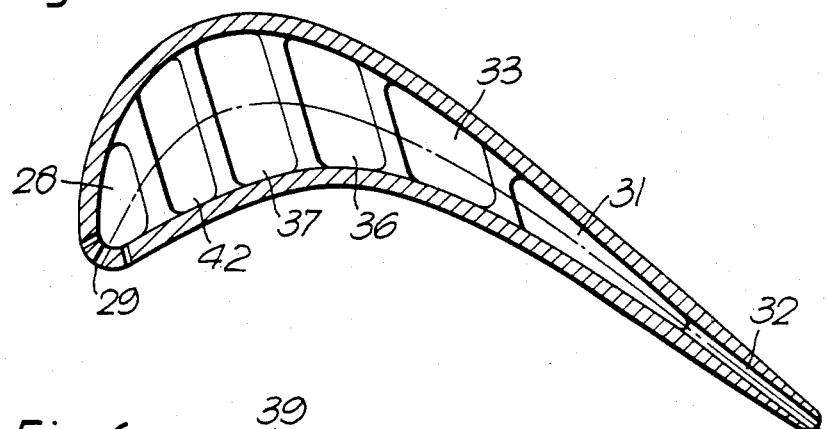
Figure 6:
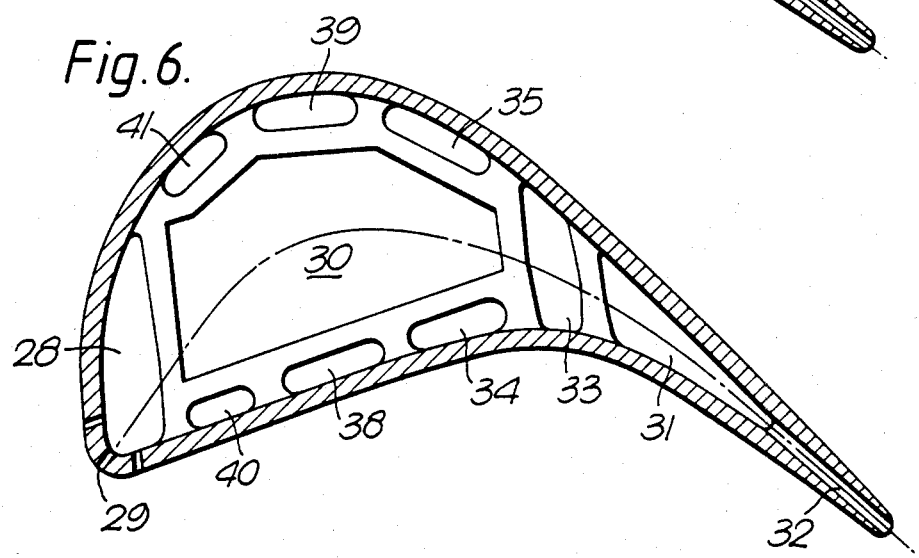

The invention will now be particularly described, merely by way of example, with reference to the accompanying drawings in which:

FIG. 1 is a partly broken-away view of a gas turbine engine having turbine blades in accordance with the invention, FIG. 2 is a 'ghosted' enlarged view of a turbine blade of the engine of FIG. 1 and in accordance with the invention, FIGS. 3, 4, 5 and 6 are sections, enlarged in the case of FIGS. 4-6, on the lines 3—3 4—4 5—5 and 6—6 respectively of FIG. 2

Figure 7:
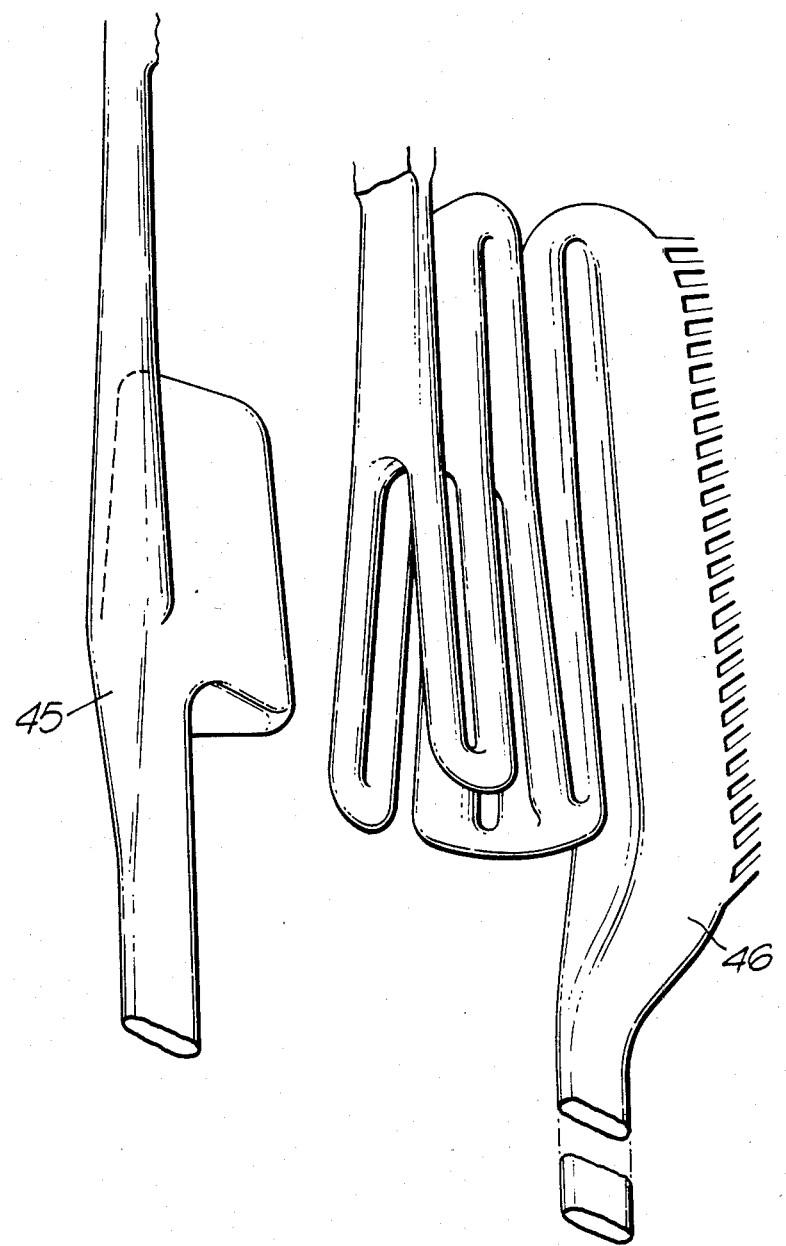

FIG. 7 is a perspective view of the ceramic cores used in a casting process to define the cavities and passages within the blade of FIGS. 2-6.

In FIG. 1 the gas turbine engine comprises a fan 10, an intermediate pressure compressor 11, a high pressure compressor 12, a combustion chamber 13, a high pressure turbine 14, an intermediate pressure turbine 15, a low pressure turbine 16 all in flow series. Operation of the engine is conventional in that air is taken into the fan 10 where it is compressed. This compressed air is divided into two flows one of which passes between the fan casing 17 and the core engine casing 18 to provide propulsive thrust while the remainder enters the intermediate pressure compressor. The compressed air is mixed with fuel and burnt in the combustion chamber 13 and the hot gases resulting from this combustion pass through the tubines 14, 15 and 16 to drive them. The turbines are drivingly interconnected with their respective compressors so that they cause them to operate. Hot gas leaving the turbine 16 provides additional propulsive thrust.

The blades 19 of the high pressure turbine 14 operate under extremely arduous conditions of high temperature and stress, and require complex and ingenious design to enable them to withstand these conditions. FIG. 2 shows one of the blades 19 in greater detail so that its construction may be seen.

Each blade 19 comprises a root 20, a shank 21, a platform 22 and an aerofoil 23. The root 20, shank 21 and platform 22 are broadly conventional, but the aerofoil 23 differs from the conventional design in that it is made relatively thick at its 'root end' adjacent the platform 22 and tapers over its span to a relatively thin tip section. This taper gives the aerofoil considerable resistance to being broken off adjacent to the platform 22, but causes complications in the cooling system required.

The FIG. 2 illustration is drawn 'ghosted' so that the internal cooling air flow system of the blade is exposed to view. Cooling air may enter the blade through two entry apertures 24 and 25 formed in the lowermost face of the root 20. These apertures allow the cooling air to flow through two passages 26 and 27 respectively which convey the air through the shank 21 and platform 22 and into the aerofoil 23.

Passage 26 conveys the cooling air to the leading edge region of the aerofoil and feeds a single leading edge cooling passage 28. Numerous film cooling holes 29 allow the majority of the air from the passage 28 to flow to the external surface of the leading edge of the aerofoil and to provide film cooling of this very hot region. It will also be seen that connected to the passage 28 adjacent the platform 22 is a central cavity 30 which extends only partway up the span of the blade (see FIG. 3). The presence of this cavity does not affect the performance of the leading edge passage 28, but it enables the cooling system of the remainder of the blade to be dimensioned efficiently as well as lightening the aerofoil.

The cooling system for the remainder of the blade is fed from the passage 27 which feeds cooling air into a first passage 31 of a multi-pass system. The passage 31 runs adjacent the trailing edge of the aerofoil and some of the air entering the passage flows out through an array of narrow trailing edge exhaust passages 32 to cool the thin trailing edge of the aerofoil. The remaining air reaches the end of the passage adjacent the tip of the blade and reverses direction into a second passage 33, flowing in the reverse direction (i.e. toward the platform 22). The passage 33 is just to the rear of the cavity 30.

On reaching the platform end of the passage 33 the air again reverses direction to flow from platform to tip in the next passage arrangement. Because of the presence of the cavity 30 it is no longer possible for the air to flow in a single passage like those at 31 and 33; instead the passage 33 bifurcates at its platform extremity to form two passages 34 and 35 (FIGS. 2, 3 and 6) each of which extends between the cavity 30 and one of the flanks of the aerofoil.

The passages 34 and 35 (FIGS. 2, 3 and 6) again extend spanwise of the blade until clear of the top of the cavity 30, where they join to form a single passage 36 (FIGS. 2, 4 and 5) which extends to the top of the blade. Air from the passage 33 is therefore caused to split into two parts feeding the passages 34 and 35, and then rejoins to form a single flow in the passage 36 out to the tip of the aerofoil.

Once again the air then reverses direction, flowing toward the platform of the aerofoil initially in the single passage 37 (FIGS. 2, 4 and 5). At about the mid height of the aerofoil the intrusion of the cavity 30 requires the passage 37 to bifurcate into two passages 38 and 39 (FIGS. 2 and 6) which again pass between the cavity 30 and the flanks of the blade. For a final time the flow is reversed from passages 38 and 39 into passages 40 and 41 (FIGS. 2 and 6) when the platform is reached, and as with the passages 34 and 35, once the top of the cavity is cleared the passages 40 and 41 join to form a single passage 42 (FIGS. 2, 4 and 5). The passage 42 extends all the way to the top of the aerofoil, and the remaining cooling air exits from the blade via an aperture 43 in the tip of the aerofoil.

The cooling system provided by this array of passages is therefore a relatively simple type of multi-pass or serpentine passage cooling in which the air flows up and down the blade, making five passes in all, extracting heat from the metal by forced convention. By providing the dead cavity 30 the thickness of metal in which the passages run is maintained approximately constant, (see FIGS. 4-6). This enables the passage size to be maintained at a value which will allow the necessary airflow speed, albeit at the expense of having to bifurcate the passages round the dead cavity 30. Therefore the construction provides the mechanical strength required at the root end of the aerofoil while maintaining an effective practical cooling system.

Manufacture of the blade as illustrated may be carried out relatively simply by the lost-wax casing process using ceramic cores to define the various passages and the central cavity 30. FIG. 7 illustrates this ceramic core, which is made as two interfitting pieces 45 and 46. Piece 45 defines the leading edge passage 28 and the dependant cavity 30, while piece 46 defines the trailing edge passage 31, trailing edge exit passages 32, and the remainder of the multi-pass system including the bifurcated passages.

As an alternative, it would be possible to make the blade in two halves, split approximately down the mid-chord line. The central cavity 30 would then be defined by a sheet metal insert dividing up a larger cavity which would also incorporate the bifurcated passages 34, 35, 38, 39, 40 and 41.

It will be appreciated that there are various ways in which the illustrated embodiment could be altered and yet still maintain the features of the invention. Thus in particular the blade could be of the shrouded or unshrouded type, and the cooling system could be one of a large number as long as it retained the feature of the central cavity and bifurcated passages; in particular the general direction of flow in the serpentine passages could well be rearward instead of forward.

We claim:

1. A cooled turbine blade for a gas turbine engine comprising an aerofoil having a root end, a tip end and a spanwise extent with convex and concave flanks, said aerofoil having a taper in cross-section from said root end to said tip end with said root end being thicker than said tip end, a first set of cooling air passages extending spanwise of said aerofoil between said root end and said tip end, a dead central cavity extending from said root end of the aerofoil part way up said spanwise extent of the blade and terminating short of said tip end below upper extremities of said first set of cooling air passages, said aerofoil having a relatively constant metal thickness between said cavity and both of said flanks, said first set of cooling passages forming a part of a multi-pass cooling system and bifurcating to pass between said cavity and both flanks of the aerofoil, said first set of cooling passages being of conventional form outboard of said dead central cavity and splitting at said bifurcation into duplicated passages between said dead central cavity and said both flanks of the aerofoil, and a further cooling passage extending adjacent the leading edge of said aerofoil and from which said dead central cavity extends.

2. A cooled turbine blade as claimed in claim 1 and in which an array of cooling air exit passages extend from said entry passage through the trailing edge of the aerofoil.

3. A cooled turbine blade as claimed in claim 1 including an air entry passage extending adjacent the trailing edge of said aerofoil, said air entry passage communicating with said first set of cooling air passages so that flow through said multi-pass system is in a general direction forward from said air entry passage toward the leading edge of said aerofoil.

* * * * *